United States Statutory Invention Registration [19]

[11] Reg. Number: H895

Weber [43] Published: Mar. 5, 1991

[54] FILTERED INFLOW AND EMERGENCY HEPA EXHAUST DURING ASBESTOS REMOVAL

[76] Inventor: John Weber, c/o 303 Derby Ave., Oakland, Calif. 94601

[21] Appl. No.: 407,105

[22] Filed: Sep. 14, 1989

[51] Int. Cl.[5] ..... B01D 46/00

[52] U.S. Cl. ..... 55/97; 55/309; 55/493

*Primary Examiner*—Donald P. Walsh

*Attorney, Agent, or Firm*—Robert A. Vanderhye

[57] ABSTRACT

In asbestos abatement or decontamination work, negative pressure is established within a work area, and air entering the work area in response to the negative pressure is caused to pass through or past a HEPA filter in an air inlet to the work area. If the negative pressure within the work area ceases, as in an emergency situation, any air exiting the work area through the air inlet is caused to pass through the HEPA filter. This may be accomplished by pivotally mounting the HEPA filter for rotation about a horizontal axis so that it moves out of the way of inflowing air, while outgoing air must pass through the filter. Alternatively, a fan may also be mounted in the air inlet and may be operated in response to pressure within the work area, so that when a negative pressure condition exists within the work area the fan is operated to force air into the work area through the HEPA filter, while if the negative pressure condition terminates, the fan is turned off, so that any air exiting through the inlet must pass through the HEPA filter.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

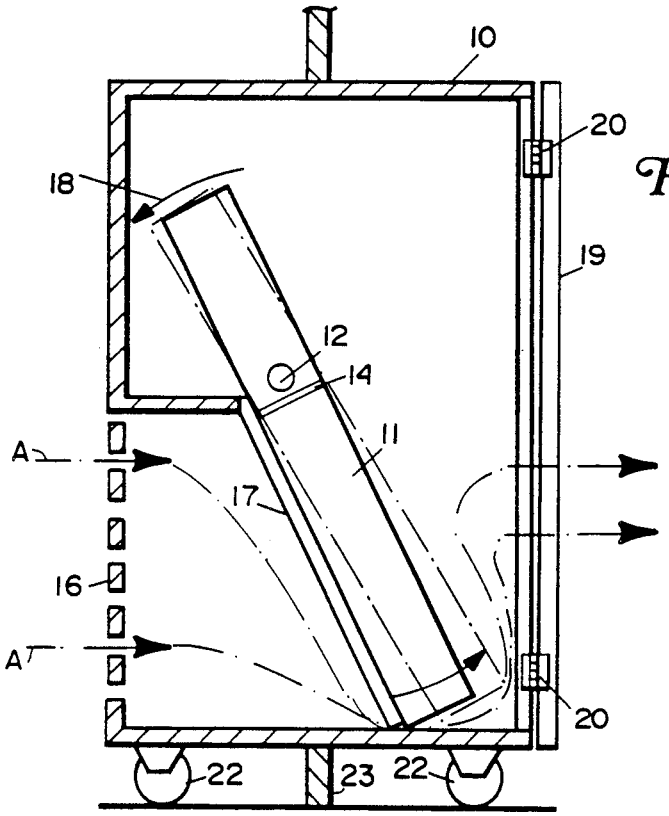
FIG. 1
FIG. 2
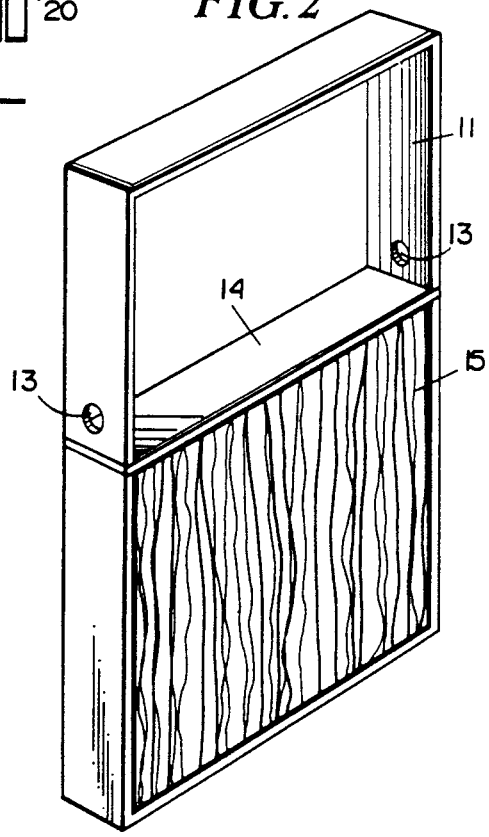
FIG. 3
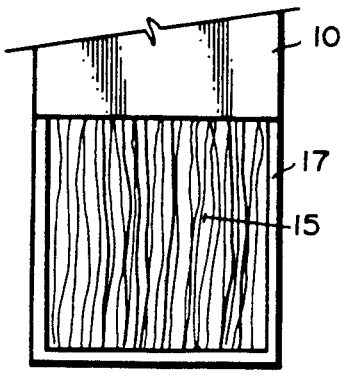

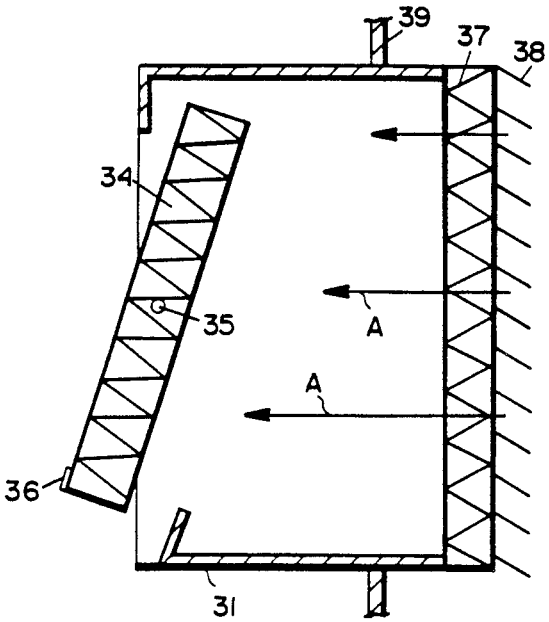
FIG. 4
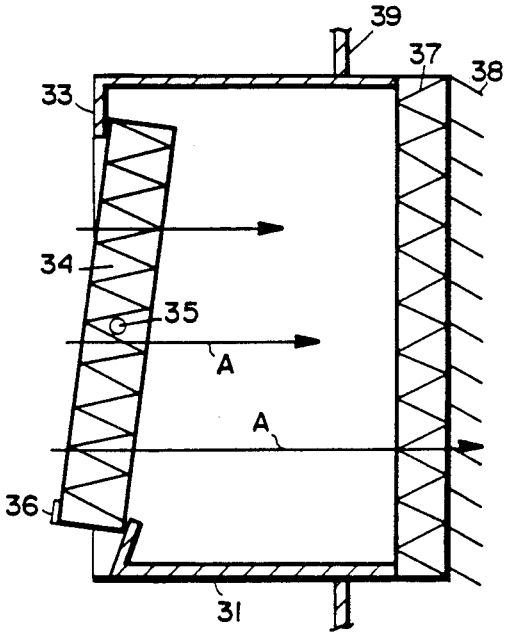
FIG. 5
FIG. 6
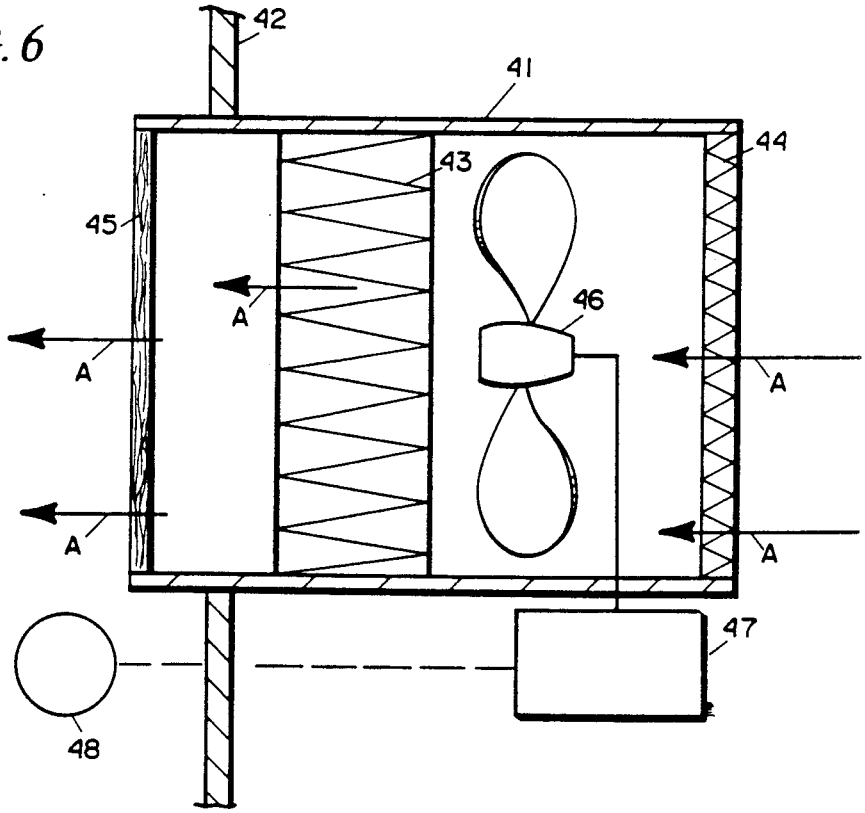

FIG. 7
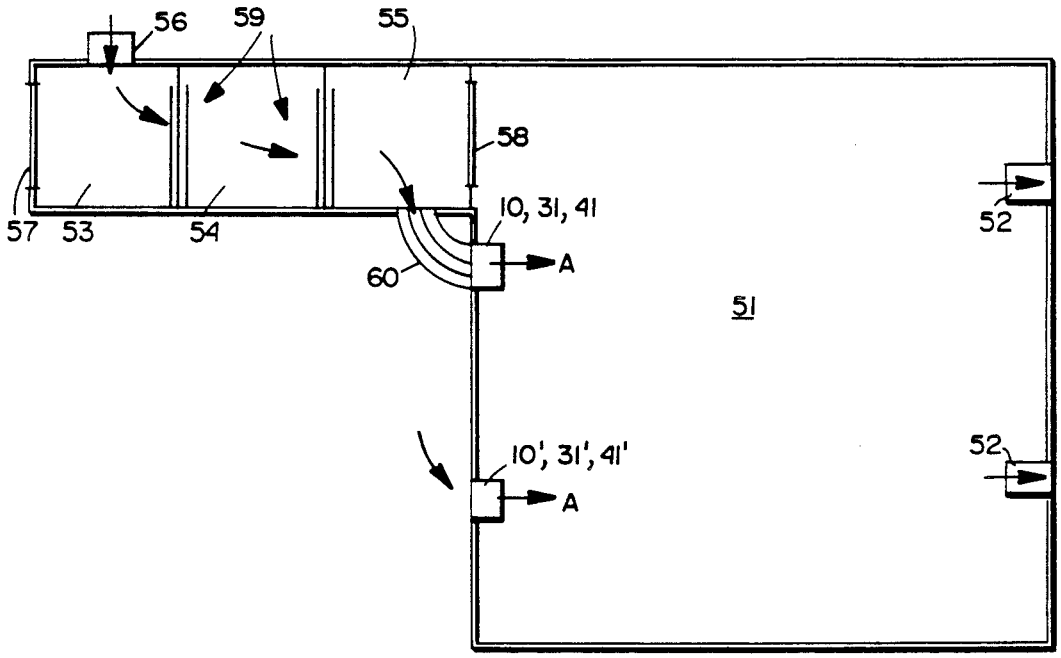
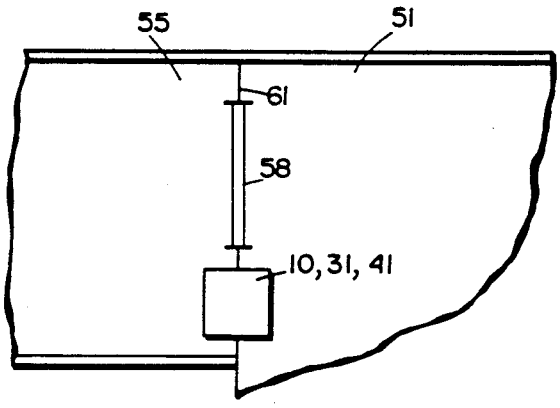
FIG. 8

FILTERED INFLOW AND EMERGENCY HEPA EXHAUST DURING ASBESTOS REMOVAL

BACKGROUND AND SUMMARY

In decontamination systems, such as work spaces contaminated with air borne particles such as asbestos particles during asbestos removal operations, it is desirable to see that no air borne particles, such as asbestos fibers, ever leave the work area. In the past, such as in the Greensboro, N.C. Main Post Office Building removal operation, this has been facilitated by providing overlapping polyethylene sheets between the decontamination area and the work area. Air moves into the work area through the overlapping plastic sheets, however if at any time the negative air pressure that is maintained within the work area is lost, the overlapping sheets preclude ambient air in the work area from passing out of the work area into the decontamination area. While such an arrangement is effective, out of an abundance of caution it may be desirable under some circumstances to guard against a positive pressure situation occurring within the work area (instead of a negative pressure situation). Under such circumstances, it is desirable to see that any air that does exit the work area has been properly filtered.

In order to accomplish the above-stated objective, a HEPA filter is provided in a number of different configurations in an air inlet to the work area, e.g. an inlet through a decontamination area. Any air exiting the work area must pass through the HEPA filter, and therefore the air borne particles, such as asbestos fibers, are removed. Thus the decontamination, or other outside area, is not contaminated with asbestos particles even if a positive pressure should somehow develop in the work area.

BRIEF DESCRIPTION OF THE DRAWINGS

FIG. 1 is a side view, partly in cross section and partly in elevation, of a first embodiment of a device for filtering air that may have a tendency to pass out of a designed negative pressure area;

FIG. 2 is a perspective view of the filter component of the device of FIG. 1;

FIG. 3 is a view looking in at the filter from the back of the device of FIG. 1 with the screen removed;

FIG. 4 is a side schematic cross-sectional view of a second embodiment of a device for filtering air that may pass out of a designed negative pressure area, shown in the normal, open, position allowing air ingress into a negative pressure area;

FIG. 5 is a view like that of FIG. 4 showing the device in the emergency, closed, position when "negative air pressure" has been lost in the designed negative pressure area;

FIG. 6 is a side schematic view, partly in cross section and partly in elevation, of a third embodiment of a device for filtering air that may pass out of a designed negative pressure area;

FIG. 7 is a schematic top plan view showing a work area environment in which the devices of FIGS. 1–6 may be utilized; and FIG. 8 is a detailed schematic top plan view of a part of a work area environment showing a modified manner of utilizing a device of FIGS. 1–6.

DETAILED DESCRIPTION OF THE DRAWINGS

One embodiment for accomplishing the desired results is illustrated in FIGS. 1 through 3 of the drawings. In this embodiment, within a cabinet 10 there is provided a frame 11 pivoted about pivot pins 12 extending from the cabinet 10 sidewalls and engaging openings 13 in the frame 11. The pins 12 define a horizontal axis. The top part of the frame 11 may be a void, but in the bottom part, below the slat 14, is a HEPA filter 15 (e.g. a one inch thick filter). Air may pass into the cabinet 10 through the screened inlet 16 (which as been removed in the rear view of FIG. 3, but can be seen in the side view of FIG. 1, which is partly in cross-section and partly in elevation). The air A flows past the edge portions 17 of the cabinet 10 that define a seat for the frame 11, and causes the frame 11 with included HEPA filter 15 to pivot in the direction of arrow 18 (FIG. 1), so that a large volume of air may flow into the cabinet 10. A front door 19 may be provided on the cabinet 10. The door 19 may be solid, in which case it is merely opened by pivoting it about hinges 20 when the device is to be utilized, or it may be perforated to allow free air flow through it, or it may have manually adjustable louvers in it to vary the amount of air that can flow through it.

The mounting of the filter 15 by pivot pins 12 in the openings 13 in the frame 11 is such that although the filter will move out of the way (dotted line position in FIG. 1) as a result of air flow A due to normal negative pressure (e.g. about 0.02 inches water below atmospheric) in the work area, should that air flow stop the filter readily will move back to the position illustrated in solid line in FIG. 1, in which position any air from the work space will be required to pass through the filter 15 to exit the work space.

Wheels 22 may be provided for the cabinet 10 if desired. Although the cabinet 10 will be completely surrounded on the sides, top, and bottom thereof with a wall 23, once asbestos removal at a given site is completed, and portions of the wall 23 mounting the cabinet 10 removed, the cabinet 10 may be wheeled—via the wheels 22—to another use location.

FIGS. 4 and 5 indicate another version of the pivoted HEPA filter. In this embodiment a cabinet 31 is provided having end flanges 32, 33 in an inlet to it, and a HEPA filter 34 is provided pivotal about pivot pins 35, which define a substantially horizontal axis. The HEPA filter 34 tends to assume the position illustrated in FIG. 5 should the negative pressure in the work area ever be cut off. In order to ensure that the filter 34 will move to the FIG. 5 position under these circumstances, a weight 36 may be provided at the bottom end. Under normal circumstances, air flow A in FIG. 4 pivots the filter 34 about the axis defined by pivot pins 35 so that air A may flow into the work area from the clean surroundings. The air passes through a two inch pleated filter 37 and a manual louver 38, which is adjustable to control the amount of air, before passing into the interior of the cabinet 31. The cabinet 31 is mounted in a wall 39, which is either a permanent or temporary wall disposed between the clean area and work area.

FIG. 6 illustrates another embodiment that ensures that there is adequate air flow into a work area for asbestos removal, while at the same time ensuring that any air that exits through the inlet passes through a HEPA filter. In this embodiment a cabinet 41 is provided which is mounted in a wall 42 separating a clean area from the work area. Within the cabinet 41 is mounted a HEPA filter 43, a pleated filter 44, one half of a flat filter 45 mounted on hinges (e.g. a door), and a fan 46. The fan 46 is mounted by a spider, or the like (not shown) to the cabinet 41. The fan 46 is controlled by a controller 47, the controller 47 being responsive to a pressure responsive gauge 48 mounted within the work area. As long as the gauge reads a negative pressure within the work area, e.g. of 0.02 inches of water below ambient pressure, the controller 47 will control the fan 46 so that the fan 46 operates to force air from the clean area, in the direction of arrows A, through the pleated filter 44, HEPA filter 43, and flat filter 45, into the work area. When the desired negative pressure no longer exists—as sensed by gauge 48—within the work area, the controller 47 is operated to shut the fan 46 off. Then, any air that moves from the work area to the clean surroundings must pass through the HEPA filter 43 before exiting.

Regardless of the particular configuration of the filtering mechanism illustrated in the earlier drawings, it preferably is mounted as illustrated in FIG. 7 or FIG. 8. FIG. 7 shows a work area 51 which has conventional air handlers 52 with HEPA filters therein, such as sold under the trademark RED BARON, for providing a negative pressure (e.g. about 0.02–0.04 inches of water below ambient pressure) within the area 51. Air flows into the work area 51 through clean room 53, shower room 54, and decontamination room 55, to the cabinet 10, 31, or 41 of the HEPA filter inlet unit. The air passes through an inlet 56 to enter the clean room 53. The inlet 56 also may, if desired, comprise one of the HEPA filter units 10, 31, 41. Human access to the clean room 35 is provided by self-closing solid door 57, and a self-closing solid door 58 separates the decontamination room 55 from the work area 51. Between the clean room 53 and shower room 54, and the shower room 54 and decontamination room 55, are provided conventional overlapping plastic flap doors 59, each comprising three sheets of 0.6 mil polyethylene film affixed along one side edge and the ceiling to the building structure, with the middle flap affixed along the opposite edge than the end flaps. A duct 60 is provided for leading the air from the decontamination room to the HEPA filter unit 10, 31, 41. Where additional air flow is desired, a second HEPA filter air inlet unit 10', 31', 41' may be provided.

The FIG. 8 embodiment is the same as the FIG. 7 embodiment only in this case instead of the inlet air passing through a duct 60 from the decontamination room 55 to the work area 51, the decontamination room 55 is made wider so that both the HEPA filter unit 10, 31, 41 and the self-closing solid door 58 may be provided in the wall 61 between the decontamination room 55 and the work area 51. This eliminates the necessity for the duct 60.

In the operation of an exemplary device as described above—particularly the FIGS. 1 through 3 device with respect to the building plan arrangement of FIG. 7—the air handlers 52 continuously exhaust air from the work area 51, creating a negative air pressure of about 0.02 inches of water below ambient. This negative air pressure causes air, passing in the direction of arrows A, to be drawn through the air inlet 56 in clean room 53, past overlapping sheet plastic doors 59, into duct 60, to pivot the frame 11 of unit 10 about the horizontal axis defined by the pivot pins 12 in the direction of arrow 18 in FIG. 1, to the dotted line position illustrated in FIG. 1. In this position the air flows freely through the cabinet 10 and the perforated or louvered door 19, into the work area 51. Where desired, extra air input to the area 51 may be provided by the unit 10' identical to the unit 10, only just connected up to a clean exterior area, not through decontamination room 55. If at any time the negative pressure within the area 51 should cease, as when the air handlers 52 are turned off or malfunction, the frame 11 will automatically pivot back to the solid line position illustrated in FIG. 1. In this position, it requires that any air exiting the work area 51 therethrough pass through the HEPA filter 15, so that the air borne asbestos particles are removed. Under most circumstances, air flow through the HEPA filter 15 to the outside environment will not be great, however if a positive pressure should somehow develop in the area 51, then a significant amounts of asbestos particles from the outgoing air will be filtered by the HEPA filter 15.

What is claimed is:

1. A method of facilitating asbestos removal work or the like, from a work area separated by solid walls from a clean area, comprising the steps of (a) normally establishing a negative air pressure within the work area;

(b) causing air entering the work area in response to the negative pressure to pass through or past a HEPA filter in an air inlet; and (c) should the negative pressure within the work area cease, requiring all air exiting the work area through the air inlet to pass through the HEPA filter.

2. A system for facilitating asbestos removal work for removing asbestos from a work area separated by solid walls from a clean area, comprising:

(a) means for normally establishing a negative air pressure within the work area;

(b) means for causing air entering the work area in response to the negative pressure to pass through or past a HEPA filter in an air inlet; and (c) means for should the negative pressure within the work area cease, requiring all air exiting the work area through the air inlet to pass through the HEPA filter.

3. A system as recited in claim 2 wherein the means (c) comprises a cabinet having the HEPA filter pivotally mounted therein for rotation about a generally horizontal axis so that it moves out of the way as air flows into the work area there past under the force of the negative pressure within the work area, but moves directly into the path of air attempting to pass out of the work area into the clean area, thereby causing the air to move through the HEPA filter.

4. A system as recited in claim 2 wherein the means (c) comprises a cabinet rigidly mounting the HEPA filter, and mounting a fan adjacent to the HEPA filter; a controller for the fan; and a pressure gauge for operating the controller, so that as long as the negative pressure is maintained within the work area the fan operates to force air from the clean area through the HEPA filter into the work area, but should the negative pressure within the work area cease, the pressure gauge will operate the controller to turn off the fan so that air may exit the work area to the clean area, but only after passing through the HEPA filter.

* * * * *